Oct. 25, 1966
T. H. KERRY
3,281,082
NOZZLES, E. G. DEFLECTING JET DISCHARGE NOZZLES FOR JET PROPULSION ENGINES
Filed Oct. 16, 1963
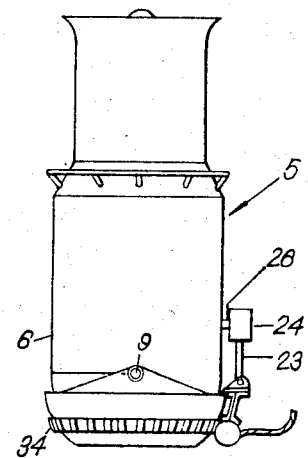
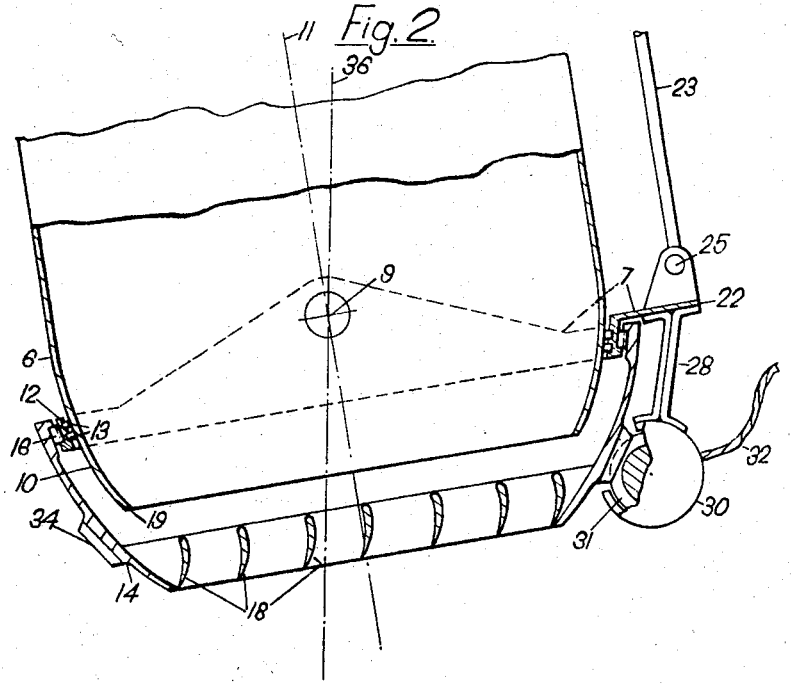
INVENTORS
THOMAS HENRY KERRY, DECEASED
BY WILLIAM JOHN RABY
REPRESENTING BARCLAYS BANK LTD.
EXECUTOR
By
Cushman, Darby & Cushman
Attorneys 3,281,082
NOZZLES, e.g. DEFLECTING JET DISCHARGE
NOZZLES FOR JET PROPULSION ENGINES
Thomas Henry Kerry, deceased, late of Amberley, Derby,
England, by William John Raby representing Barclays
Bank Limited, executor, London, England, assignor to
Rolls-Royce Limited, Derby, England, a company of
Great Britain
Filed Oct. 16, 1963, Ser. No. 317,404
7 Claims. (Cl. 239—265.35)

This invention is concerned with improvements relating to nozzles e.g. jet discharge nozzles suitable for use for deflecting the exhaust gas stream of a gas turbine jet propulsion engine.

According to the present invention, a nozzle comprises a hollow casing member through which a fluid is discharged, and a frame which is pivotally and rotatably mounted on the casing member adjacent the downstream end thereof, said frame carrying a cascade of guide vanes which extend across the path of fluid discharged from the casing member, and which are adapted to deflect said fluid in a direction depending on the position of said frame relative to the casing member. The frame may be rotatably mounted on a support member, which in turn is pivotally mounted on the casing member about a fixed axis which extends at right angles to the longitudinal axis of the casing member.

Preferably the downstream end of said casing member has an external part-spherical surface whose centre of curvature lies at the point of intersection of the longitudinal axis of the casing member with said fixed axis, said support member making sealing engagement round the periphery of said part-spherical surface.

Any suitable means may be provided for effecting pivotal and rotary movement of the frame relative to the casing member.

Preferably, jacking means e.g. a hydraulic jack, is connected between the casing member and the support member for effecting relative pivotal movement of the latter. The support member may be interconnected by gearing to the frame for effecting relative rotary movement of the latter. For example, a worm wheel driven by an electric motor may be mounted on the support member, the worm wheel engaging worm teeth on said frame.

A preferred arrangement is for the support member to have an annular portion disposed between the part-spherical surface of the casing member and the frame, anti-friction bearing means being located between said portion and the frame, said worm wheel being supported by the support member so as to engage said worm teeth provided on an outwardly facing surface of said frame.

According to a further aspect of the present invention, there is provided an engine which discharges a gaseous jet stream, e.g. a gas turbine jet propulsion engine or a turbine-driven ducted fan unit, said engine having a nozzle as mentioned above through which said jet stream is discharged.

The invention will be further described by way of example only with reference to the accompanying drawings in which:

FIG. 1 is a side view of a gas turbine jet propulsion engine provided with a nozzle in accordance with the invention, and FIG. 2 is an enlarged cross-sectional view of the nozzle of the engine of FIG. 1. The internal details of the gas turbine jet propulsion engine are not shown, but comprise in the usual manner compressor means, combustion means and turbine means arranged in flow series within the engine casing 5, the exhaust gases from the engine being discharged through a casing member 6.

As shown in FIG. 2, a support member 7 is pivotally mounted on the casing member 6 by means of two diametrically opposed pivots 9. The casing member 6 has an external part-spherical surface 10 whose centre of curvature lies on the point of intersection of the longitudinal axis 11 of the casing member and the pivoting axis defined by the pivots 9, and the support member has an annular portion 12 in which are located sealing rings 13 which extend around the surface 10 in sealing engagement therewith. A frame 14 is rotatably mounted externally of said portion 12 of the support member 7 by means of anti-friction roller bearings 16.

The frame has mounted therein a plurality of parallel guide vanes 18, seven of which are shown, the guide vanes extending across an open downstream end 19 of the casing member 6, and being curved along their chordwise extents and being mounted so as to be adapted to deflect the exhaust gases discharged therethrough from the casing member 6 and at a fixed angle to the axis of the frame 14 as shown in FIGURE 2.

The support member 7 has an outwardly extending arm 22 to which an operating arm 23 of a hydraulic jack 24 is pivotally connected at 25, the housing of the jack being connected to the casing member 6 by an arm 26. A strut 28 is also connected to the arm 22, and supports a housing 30 for an electric motor (not shown) and a worm wheel 31 driven by the motor. Electric power supply leads for the motor are shown at 32. The worm wheel 31 meshes with worm teeth 34 formed round the exterior of the frame 14.

In operation, if the jack 24 is operated, the support member 7, and hence the frame 14, will be pivoted about the pivots 9, the sealing rings 13 maintaining sealing engagement with the part-spherical surface 10 of the casing member, and the frame 14 being so constructed adjacent the roller bearings 16 as to make substantial sealing engagement with the annular portion 12 of the support member 7. The longitudinal axis of the support member can be adjusted on one side of the axis 11 to the position indicated by the chain line 36, and can be adjusted on the opposite side of the line 11 by an equal amount. If the worm wheel 31 is rotated by the electric motor, the frame 14 will rotate relative to the support member 7 so as to change the direction to which the discharged gases are deflected by the guide vanes 18.

It will be appreciated the exhaust gases from the gas turbine engine can be selectively deflected by the nozzle over a considerably greater range of directions than if for example, the frame 14 was simply rotatably mounted on the casing member 6, or if the frame 14 was simply pivotally mounted on the casing member 6.

It will further be appreciated that many modifications and variations may be made to the embodiment that has been described without departing from the scope of the invention. Thus for example, sealing means can be provided between the frame 14 and the surface 10, where they have complementary concentric part-spherical surfaces. If desired a comparable nozzle can be provided at the discharge end of a turbine-driven ducted fan unit.

What is claimed is:

1. A nozzle comprising a hollow casing member having a downstream end through which a fluid is discharged, a frame which is pivotally and rotatably mounted on the casing member adjacent said downstream end thereof, and a cascade of curved guide vanes carried by said frame and extending across the downstream end of said casing member in the path of fluid discharged from the casing member, said guide vanes being adapted to deflect said fluid to atmosphere at a fixed angle to the axis of said frame and in a direction depending on the position of said frame relative to the casing member.

2. A nozzle comprising a hollow casing member having a longitudinal axis and a downstream end through which a fluid is discharged, a support member, a pivot connection pivotally connecting the support member to the casing member about a fixed axis which extends at right angles to said longitudinal axis, a frame which is rotatably mounted on said support member, and a cascade of guide vanes carried by said frame and extending across the downstream end of said casing member in the path of fluid discharged from the casing member, said guide vanes being adapted to deflect said fluid to atmosphere at a fixed angle to the axis of said frame and in a direction depending on the position of said frame relative to the casing member.

3. A nozzle as claimed in claim 2 including jacking means connected between the casing member and the support member for effecting relative pivotal movement of the latter.

4. A nozzle comprising a hollow casing member having a longitudinal axis and a downstream end through which a fluid is discharged, said downstream end having an external part-spherical surface whose centre of curvature lies on said longitudinal axis, a support member, a pivot connection pivotally connecting the support member to the casing member about a fixed axis which extends at right angles to said longitudinal axis and which intersects said centre of curvature, seal means sealing said support member against the periphery of said part-spherical surface, a frame which is rotatably mounted on said support member, and a cascade of guide vanes carried by said frame and extending across the path of fluid discharged from the casing member, said guide vanes being adapted to deflect said fluid in a direction depending on the position of said frame relative to the casing member.

5. A nozzle comprising a hollow casing member having a longitudinal axis and a downstream end through which a fluid is discharged, a support member, a pivot connection pivotally connecting the support member to the casing member about a fixed axis which extends at right angles to said longitudinal axis, a frame which is rotatably mounted on said support member, a cascade of guide vanes carried by said frame and extending across the downstream end of said casing member in the path of fluid discharged from the casing member, said guide vanes being adapted at a fixed angle to the axis of said frame and to deflect said fluid in a direction depending on the position of said frame relative to the casing member, and a drive gear transmission interconnecting the frame to the support member for effecting relative rotary movement of the frame.

6. A nozzle as claimed in claim 5 in which said drive gear transmission comprises a driving worm wheel mounted on the support member, and worm teeth on said frame with which said worm wheel meshes.

7. A nozzle comprising a hollow casing member having a longitudinal axis and a downstream end through which a fluid is discharged, said downstream end having an external part-spherical surface whose centre of curvature lies on said longitudinal axis, a support member having an annular portion which surrounds said downstream end, a pivot connection pivotally connecting the support member to the casing member about a fixed axis which extends at right angles to said longitudinal axis and which intersects said centre of curvature, seal means sealing said support member against the periphery of said part-spherical surface, a frame surrounding said annular portion of the support member, anti-friction bearing means disposed between said annular portion and said support member and rotatably mounting the frame on the support member, a cascade of guide vanes carried by said frame and extending across the path of fluid discharged from the casing member, said guide vanes being adapted to deflect said fluid in a direction depending on the position of the frame relative to the casing member, and drive means for effecting relative rotation between said frame and said support member, said drive means comprising a driving worm wheel mounted on the support member and disposed externally of said frame, and worm teeth formed externally on said frame, said worm wheel meshing with said worm teeth.

References Cited by the Examiner

UNITED STATES PATENTS

| 2,879,014 | 3/1959 | Smith et al. | 244—12 |
| 3,067,579 | 12/1962 | Olbrich | 60—35.55 |
| 3,142,456 | 7/1964 | Lazareff | 244—23 |
| 3,155,342 | 11/1964 | Bolkow et al. | 60—35.54 X |
| 3,162,011 | 12/1964 | Mullins et al. | 60—35.55 |

FOREIGN PATENTS

| 913,311 | 12/1962 | Great Britain. |
| 913,312 | 12/1962 | Great Britain. |
| 937,270 | 9/1963 | Great Britain. |

MARK NEWMAN, *Primary Examiner.*

A. L. SMITH, *Assistant Examiner.*